(12) United States Patent
Ryoo et al.

(10) Patent No.: US 7,785,563 B2
(45) Date of Patent: Aug. 31, 2010

(54) METHOD OF THE PREPARATION OF MICROPOROUS CRYSTALLINE MOLECULAR SIEVE POSSESSING MESOPOROUS FRAMEWORKS

(75) Inventors: Ryong Ryoo, Daejeon (KR); Minkee Choi, Kangwon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 12/089,898

(22) PCT Filed: Mar. 2, 2006

(86) PCT No.: PCT/KR2006/000720

§ 371 (c)(1), (2), (4) Date: Sep. 9, 2008

(87) PCT Pub. No.: WO2007/043731

PCT Pub. Date: Apr. 19, 2007

(65) Prior Publication Data

US 2009/0156389 A1 Jun. 18, 2009

(30) Foreign Application Priority Data

Oct. 14, 2005 (KR) .................. 10-2005-0097161

(51) Int. Cl.
*C01B 39/04* (2006.01)
(52) U.S. Cl. .................................................. 423/703
(58) Field of Classification Search ............. 423/702, 423/703
See application file for complete search history.

(56) References Cited

U.S. PATENT DOCUMENTS

| 5,057,296 | A | * | 10/1991 | Beck ...................... 423/277 |
| 5,264,203 | A | * | 11/1993 | Beck et al. .............. 423/703 |
| 5,300,277 | A | * | 4/1994 | Kresge et al. ........... 423/703 |
| 5,783,167 | A | * | 7/1998 | Corma Canos et al. ... 423/701 |
| 5,800,799 | A | * | 9/1998 | Pinnavaia et al. ....... 423/701 |
| 5,830,429 | A | * | 11/1998 | Balkus et al. ............ 423/702 |
| 5,958,367 | A | * | 9/1999 | Ying et al. ............... 423/701 |
| 6,337,296 | B1 | | 1/2002 | Balducci et al. |

(Continued)

FOREIGN PATENT DOCUMENTS

JP 1997-255326 A 9/1997

(Continued)

OTHER PUBLICATIONS

International Search Report for PCT/KR2006/000720 dated Jul. 14, 2006.

*Primary Examiner*—David M Brunsman
(74) *Attorney, Agent, or Firm*—Nixon Peabody LLP; Jeffrey N. Townes

(57) ABSTRACT

The present invention relates to a method of preparing a microporous crystalline molecular sieve having mesoporous skeleton, comprising following steps: (a) adding a meso-SDA (meso-Structure Directing Agent) into a gel composition of synthesizing molecular sieve, (b) subjecting the mixture obtained in the above step (a) to crystallization by a hydrothermal reaction, a microwave reaction, a dry-gel synthesis, etc., and (c) removing selectively organic materials from the resulted material obtained in the above step (b) by a calcination or a chemical treatment. Molecular sieve having mesoporous skeleton synthesized by the present invention exhibits, as compared with conventional zeolite, a good molecule diffusion ability and a greatly improved catalytic activity.

7 Claims, 9 Drawing Sheets

U.S. PATENT DOCUMENTS

| | | | | |
|---|---|---|---|---|
| 6,364,140 B1 * | 4/2002 | Hayes | ................ | 211/188 |
| 7,119,245 B1 * | 10/2006 | Thoma et al. | ................ | 585/820 |
| 2003/0188991 A1 | 10/2003 | Shan et al. | | |
| 2008/0027260 A1 * | 1/2008 | Lai et al. | ................ | 585/475 |

FOREIGN PATENT DOCUMENTS

| | | |
|---|---|---|
| JP | 1999-226391 A | 8/1999 |
| WO | WO 96/27438 A1 | 9/1996 |
| WO | WO 01/38223 A1 | 5/2001 |

* cited by examiner

METHOD OF THE PREPARATION OF MICROPOROUS CRYSTALLINE MOLECULAR SIEVE POSSESSING MESOPOROUS FRAMEWORKS

This application is a 371 filing of PCT/KR2006/00720 filed Mar. 2, 2006.

TECHNICAL FIELD

The present invention relates to a method of the preparation of microporous crystalline molecular sieve possessing microporous frameworks or skeletons, in which intrinsic crystalline micropores are formed in the secondary mesoporous frameworks or skeletons by using a micro-SDA (micro-Structure-Directing Agent) and a meso-SDA (meso-Structure-Directing Agent), and thus prepared molecular sieve.

BACKGROUND ART

"Molecular sieve" means both of aluminosilicate-type zeolite and non-aluminosilicate-type zeolite-like materials such as pure silicates, silicoaluminophosphates or borosilicates.

Zeolite has versatile utility due to its structural features (channels and cavities) that uniform micropores (0.3 nm<diameter<2 nm) of molecular dimension are regularly arranged. One of the most important industrial applications is the role as nonhomogeneous acidic catalyst under acidified condition. The majority of the world's gasoline is currently produced by the fluidized catalytic cracking of petroleum using zeolite catalyst (Cundy, C. S. et al., Chem. Rev., 2003, 103, 663).

In addition to natural zeolite, synthetic zeolite and zeolite-like materials have various structures and properties, and therefore, they can be more widely utilized as ion exchange materials, adsorbents, and catalyst. Since the micropore diameter and structure in a molecular sieve constitute important factors to control adsorption ability and catalytic ability, syntheses of molecular sieves having a new structure are actively attempted in order to improve the adsorption ability and catalytic ability of molecular sieves. In rescent, molecular sieves which micropore sizes are extended to 2 nm~50 nm have been developed, but they are non-crystalline and have very different properties as compared with those of crystalline molecular sieves. As a result, their utilization is low.

The molecule diffusion rate in zeolite is very low due to its microporous structure, which restricts a reaction rate in many applications. Therefore, there have been attempts to improve the molecule diffusion into micropores by increasing the outer surface area of zeolite particles itself, and thereby facilitating the approach of molecules to the micropores.

At first, there have been attempts to synthesize zeolite in a very small particle size in order to synthesize zeolite particles possessing a wide outer surface area (e.g., Valtchev, V. P. et al., Chem. Mater., 2005, 17, 2494). The small particle size was suggested to offer the advantage of facile diffusion of reactants. However, filtration of the small zeolite particles was not easily achievable due to the colloidal properties. Ul-tracentrifugation was commonly used for the sample collection, which significantly increased the cost of bulk production.

Next, several attempts to synthesize microporous zeolites possessing secondary mesopores (2 nm<diameter<50 nm) were reported to overcome the problem. Anderson et al. reported a preparation method of zeolite materials possessing large secondary pores, through a crystallization process utilizing the infiltration of zeolite seed crystals into mesoporous diatomaceous earth (Anderson, M. W. et al., Angew. Chem. Int. Ed., 2000, 39, 2707). Pinnavaia et al. also carried out a self assembly of pre-formed zeolite seed crystals in the presence of surfactant to prepare mesoporous materials (U.S. Pat. No. 6,770,258 B2). Kaliaguine et al. coated the mesopore walls of pre-synthesized mesoporous silica with zeolite seed crystals (U.S. Pat. No. 6,669,924 B1). The resultant materials synthesized with these strategies were claimed to exhibit enhanced hydrothermal stability, compared with amorphous aluminosilicate materials having similarly mesoporous structure. It was also claimed that molecular diffusion took place rapidly, compared with the absence of mesopores. However, no direct evidence by X-ray diffraction (XRD) or electron microscopy was supported as to the structure comprising crystalline zeolite. Furthermore, the use of pre-formed zeolite seed crystals was a problem of complicating the overall synthesis process and thereby increasing the cost of production.

In recent, mesoporous zeolites were also prepared by crystallization in the presence of various solid templates such as carbon nanoparticles, nanofibers and polymer beads. Zeolites crystallization occurred across the template particles, and combustion of the template particles led to the formation of mesopores within the resultant zeolite crystals. Stein et al. reported a technology wherein polystyrene beads having a uniform size around 100 microns could direct the formation of mesoporous silicalite-1 (U.S. Pat. No. 6,680,013 B1). Jacobson synthesized mesoporous zeolites with a wide pore-size distribution of 10-100 nm by using carbon black particles as a template. (U.S. Pat. No. 6,620,402 B2). More recently, Kaneko and coworkers synthesized mesoporous ZSM-5 monolith with a narrow pore size distribution via similar carbon templating method by using nano-sized carbon aerogel as a template (Kaneko, K. et al., J. Am. Chem. Soc., 2003, 125, 6044). The resulting materials prepared from the templating methods exhibited XRD patterns corresponding to the particular zeolite structures. The templated zeolites were reported to exhibit an enhanced catalytic activity due to the facile molecular diffusion via the mesopores (Christensen, C. H. et al., J. Am. Chem. Soc., 2003, 125, 13370). However, the solid-templating methods required use of a suitable template material, and more importantly, a precise control of process was required so that the crystallization could occur selectively within the templating zone. This was a major factor for complicating the preparation process and increasing the production cost.

Zeolite materials having both of micropores and mesoposes in a particle have multiple advantages. The intrinsic micropores in the zeolite framework provide with molecule selectivity and active sites and the additional mesopores facilitate the molecule diffusion within micropores to improve the diffusion and adsorption of molecules as well as to modify the diffusion and adsorption of even larger molecules.

DISCLOSURE OF INVENTION

Technical Problem

Therefore, there has ever been requested to develop a method of synthesizing in a simple and economic manner a molecular sieve having both of micropores and mesopores, that is, a molecular sieve in which zeolite crystals formed with mipropores frames or constructs a mesoporous framework or skeleton.

Technical Solution

The present inventors has discovered that, by employing both of a micro-SDA (micro-Structure Directing Agent, as a micropore-forming agent) and a meso-SDA (meso-Structure Directing Agent, as a mesopore-forming agent), it is possible to synthesize a molecular sieve having both of micropores and mesopores, that is, a molecular sieve in which zeolite crystals formed with mipropores frames or constructs a mesoporous framework or skeleton.

Specifically, the present inventors has confirmed that zeolite crystals having mipropores are constructed in the form of mesoporous skeleton when a meso-SDA (mesopore-forming agent) selected from an organosilane having a self-assembled organic group, an organophosphonic acid or a silica precursor organically functionalized with self-assembled organic groups is further added into a mixture of synthesizing a molecular sieve containing micro-SDA, and then completed the present invention.

Advantageous Effects

Zeolite or molecular sieve having mesoporous skeleton synthesized by the present invention has advantageous, as compared with conventional zeolite, that additional mesopores linked with micropores greatly improves or modifies the molecule diffusion ability, the catalytic activity and the ion exchange ability, and thereby to facilitate the diffusion and adsorption of organic macromolecules. Therefore, it is expected that zeolite or molecular sieve of the present invention is expected to exhibit superior utilities in separation and catalytic reaction of macromolecules as well as the catalytic reforming process of petroleum including heavy oil.

BEST MODE FOR CARRYING OUT THE INVENTION

Figure 1:
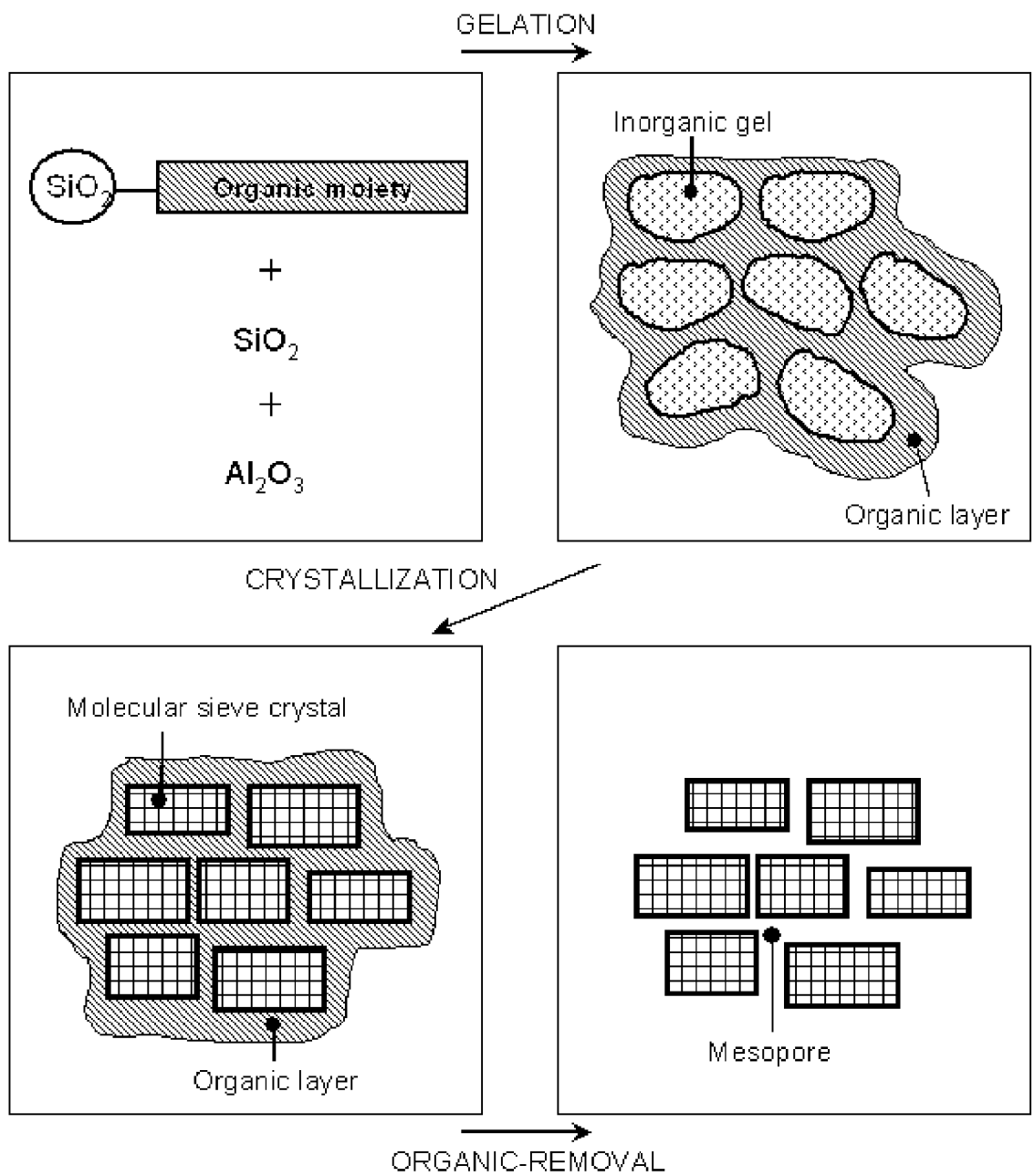
FIG. 1 is a schematic illustration of the preparation procedures of mesoporous molecular sieves in accordance with the present invention.

The purpose of the present invention is to provide a method of preparing a microporous crystalline molecular sieve having mesoporous skeleton, characterized in that a meso-SDA (structural-directing agent) having a self-assembled organic group is added into a gel composition for the synthesis of molecular sieve containing a micro-SDA to form an organic-inorganic composite gel composition, wherein the meso-SDA having self-assembled organic group(s) includes, for example, an organosilane having self-assembled organic group(s), an organophosphonic acid having self-assembled organic group(s), and a silica precursor organo-functionalized with self-assembled organic group(s).

Another purpose of the present invention is to provide a method of preparing a microporous crystalline molecular sieve having mesoporous skeleton, comprising following steps (a) to (c):

(a) adding a meso-SDA into a gel composition of synthesizing molecular sieve such as, for example, a gel composition of synthesizing zeolite which contains a micro-SDA, a silicon source and an aluminum source;

(b) subjecting the mixture obtained in the above step (a) to crystallization by a hydrothermal reaction, a microwave reaction, a dry-gel synthesis, etc.; and (c) removing selectively organic materials from the resulted material obtained in the above step (b) by a calcination or a chemical treatment such as hydrogenation, Hoffman elimination or hydrolysis.

Another purpose of the present invention is to provide a microporous crystalline molecular sieve having mesoporous skeleton.

In below, the present invention is described in details.

In the context of the prior art and the present invention, "microporous molecular sieve" means a molecular sieve in which its molecular sieve crystals are constituted with micropores having diameters of 0.3 nm~2 nm and "mesoporous molecular sieve" means a molecular sieve in which its molecular sieve crystals are constituted with mesopores having diameters of 2 nm~50 nm. However, the above ranges of diameter of micropores and mesopores are not critical and sometimes represent their relative sizes.

In the context of the present invention, "microporous molecular sieve having a mesoporous skeleton" or "molecular sieve having a mesoporous skeleton" means that molecular sieve crystals are constituted with micropores whereas said molecular sieve crystals are framed to form a mesoporous skeleton. For example, "microporous molecular sieve having a mesoporous skeleton" means a molecular sieve in which molecular sieve crystals are constituted with micropores having diameters of 0.3 nm~2 nm whereas said molecular sieve crystals are framed to form a mesoporous having diameters of 2 nm~50 nm. Herein, the above expression may be employed when molecular sieve crystals having diameters between 2 nm~50 nm are constructed to frame a bigger-sized skeleton.

In the context of the present invention in reference, "mesoporous molecular sieve", which is a term used in prior art, is distinctly different from "(microporous) molecular sieve having a mesoporous skeleton" which is a term used in the present invention.

In the context of the present invention, "self-assembled organic group" means organic groups which can align by noncovalent bond such as van der Waals force, dipole-dipole moment, ionic interaction, and for example, compounds having alkyl group, cationic surfactants, anionic surfactants, nonionic surfactants, amphoteric surfactants, organic groups employed in liquid crystal compounds, especially organic groups providing with self-assembly can be mentioned.

As a micro-SDA (micro-Structure-directing Agent), it is possible to use alkaline metal ions, quaternary ammonium salts, organic ammonium salts. Tetraalkylammonium such as tetramethylammonium, tetraethylammonium, tetrapropylammonium, etc., may be preferably employed.

In a preferred embodiment of the present invention, the organosilane having a self-assembled organic group can be selected from compounds represented by the following formula (1):

$$RSiX_3 \text{ or } R_2SiX_2 \text{ or } R_3SiX \qquad (1)$$

wherein X independently represents a hydrolysable groups such as hydroxyl, halide or alkoxy, R independently represents a $C_{2-30}$ alkyl or alkenyl group, wherein said alkyl group may have at least one substituent selected from a group consisting of hydroxyl, halide, thiol, amino, cyano, nitro, amide, carboxylic acid, sulphonic acid, glycidyl, aryl or heteroaryl and may have 1 to 3 heteroatoms selected from N, O, S and Si in alkyl chain.

Illustrative examples of monomeric organosilane employable in the present invention include but not limited to:

[3-(Trimethoxysilyl)propyl]octadecyldimethylammonium chloride;
[3-(Trimethoxysilyl)propyl]hexadecyldimethylammonium chloride;
[3-(Trimethoxysilyl)propyl]dodecyldimethylammonium chloride;
[3-(Trimethoxysilyl)propyl]octylammonium chloride;
N-[3-(Trimethoxysilyl)propyl]aniline;
3-[2-(2-Aminoethylamino)ethylamino]propyl-trimethoxysilane;
N-[3-(Trimethoxysilyl)-propyl]-N'-(4-vinylbenzyl)ethylenediamine;
Triethoxy-3-(2-imidazolin-1-yl)propylsilane;
1-[3-(Trimethoxysilyl)propyl]urea;
N-[3-(Trimethoxysilyl)propyl]ethylenediamine;
[3-(Diethylamino)propyl]trimethoxysilane;
(3-Glycidyloxypropyl)trimethoxysilane;
3-(Trimethoxysilyl)propyl methacrylate;
[2-(Cyclohexenyl)ethyl]triethoxysilane; dodecyltriethoxysilane;
Hexadecyltrimethoxysilane;
(3-Aminopropyl)trimethoxysilane;
(3-Mercaptopropyl)trimethoxysilane; and
(3-Chloropropyl)trimethoxysilane.

In another preferred embodiment of the present invention, organophosphonic acid having a self-assembled organic group can be selected from compounds represented by the following formula (2):

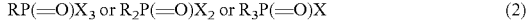
$$RP(=O)X_3 \text{ or } R_2P(=O)X_2 \text{ or } R_3P(=O)X \qquad (2)$$

wherein X and R are similarly defined as above.

In the present invention, an orgnosilane or organopohophonic acid preferably mentioned as meso-SDA is covalently connected via oxygen atom to Si and/or Al atom to form an organic-inorganic composite gel structure in a gel composition of synthesizing a molecular sieve, wherein self-assembled organic groups (represented as R) contained in said orgnosilane or organopohophonic acid are noncovalently bonded to each other to define mesopores. Said mesopores are framed and formed by the covalent bonds of Si—O—R (organic group) and the noncovalent bonds between self-assembled organic groups and thus framed and formed mesopores and their structures are not destroyed or transferred during further crystallizing step. In addition, since mesopores framed and formed by meso-SDSA (meso-structure-directing supplement aid) also cannot be destroyed or transferred during further crystallizing step since they said meso-SDSA may form a noncovalent bond with self-assembled organic groups convalently bonded to Si atom.

In the context of the present invention, "silica precursor organo-functionalized with a self-assembled organic group" means a silica precursor to which a self-assembled organic group links via covalent bond with Si atom. As said self-assembled organic group, the group exemplified in above with regard to the substituent R in Formula (1) can be mentioned. Such "silica precursor organo-functionalized with a self-assembled organic group" can be prepared, for example, by reacting a silica precursor with "an orgnosilane and organopohophonic acid having self-assembled organic groups".

According to one preferred embodiment of the present invention, therefore, "silica precursor organo-functionalized with a self-assembled organic group" can be prepared by reacting a silica precursor with an orgnosilane of formula (1) or an organopohophonic acid of formula (2).

As a silica precursor used to prepare a silica precursor organo-functionalized with a self-assembled organic group, a material may be selected which can form a covalent bond with a silicon atom and an organo-functional group, such as silicate ion, colloidal fumed silica, silica gel or precipitated silica, to which the present invention is not limited.

In the present invention, it is possible to adjust the shape or size of mesopores by further adding an additive material capable of noncovalently bonding with a meso-SDA, including for example, hydrocarbons, such as alcohols; surfactants, such as anionic, cationic, nonionic amphoteric surfactants; high molecular weight materials, such as synthetic or natural polymer, etc.; biomaterials; inorganic salts; etc., to form cluster, emulsion, microsphere, aggregated particles. Hereinafter, such additive materials are referred to as meso-Structure-Directing Aid or meso-Structure-Directing Supplement Agent (hereinafter, referred to as "meso-SDSA").

According to one preferred embodiment of the present invention, in case where the self-assembly ability of a meso-SDA is insufficient, it is possible to further incorporate a meso-SDSA to supplement the formation of mesopore structure and skeleton. For example, in case where the self-assembled organic group is not functionalized or the number of carbon atoms in main chain is not more than 3, particularly not more than 6, more particularly not more than 8, the power causing self-assembly such as van der Waals force and ionic bonding force may be insufficient, and as a result, it is difficult to form a stable mesopore-framed structure by using only meso-SDAs. In such case, the addition of a meso-SDSA such as a surfactant or a high molecular weight material can facilitate the formation of mesopore-frame structure and improve the stability of thus formed mesopore-frame structure.

According to one variation of the present invention, apart from an organosilane or organophosphoic acid described as above, it is basically possible to employ, as a meso-SDA material according to the present invention, a material which can covalently combine a self-assembled organic group to the framework of a gel of synthesizing a molecular sieve, or a material which can covalently bind the framework of a gel for synthesizing a molecular sieve as well as has a structure containing a self-assembled organic group in it. Of course, such modification belongs to the scope of the present invention.

In the present invention, the amount of a meso-SDA to be used is not particularly restricted, but it is generally used in an amount of 0.01~50 mol %, preferably 0.05~20 mol %, more preferably 0.1~10 mol %, based on the amount of SiO or its precursor. Similarly, the amount of a meso-SDSA such as a surfactant or high molecular weight materials is not particularly restricted, but it is generally used in an amount of 1~300 mol %, preferably 5~100 mol %, more preferably 10~50 mol %, based on the amount of SiO or its precursor.

Molecular sieves which can be applied to the present invention include zelolite materials such as aluminosilicate and zeolite-like materials such as silicate, titanosilicate, aluminophosphate, silicoaluminophosphate or borosilicate, to which the present invention is not limited.

Therefore, a gel composition for synthesizing a molecular sieve should be prepared by adjusting its constitutional components and content according to the type and shape of targeted molecular sieve. A gel composition for synthesizing zeolite comprises at lease one silicon source and at least one aluminum source and a gel composition for synthesizing a molecular sieve of silicate series comprises at lease one silicon source.

In the present invention, the method and condition for the preparation of a molecular sieve are known in the art, and no particular restriction is not mentioned.

FIG. 1 is a schematic illustration of the preparation procedures of mesoporous molecular sieves in accordance with the present invention.

In below, the method of preparing zeolite of the present invention is divided into three processes and then specifically explained as follows.

The First Process: Formation of Inorganic-Organic Composite Gel

An organic-inorganic composite gel is synthesized by polymerizing precursor materials of synthesizing zeololite such as silica and/or alumina together with an organosilane, an organophosphonic acid or an organo-functionalized silica precursor. Hydrophobic organic domains are self-assembled by non-covalent force such as van der Waals forc, dipole-dipole interaction, ionic interaction, etc., and are discontinuously formed between inorganic domains. Gel domains of forming molecular sieve are continuously or locally arranged in regular manner depending on the type and concentration of organic materials. The addition of a meso-SDSA such as surfactants, high molecular weight materials or inorganic salts can facilitate the formation of hydrophobic organic domains and improve the stability of thus formed organic-inorganic composite gel.

The Second Process: Crystallization

Inorganic gel domains stabilized by organic domains are transformed one by one to minute zeolite crystal grains. At this time, the stabilization effect by the organic materials surrounding each zeolite crystal grain suppresses the further growth of the zeolite crystal grains. Further, the size of zeolite crystal grains can be controlled within nanometer range and the certain distance between zeolite crystal grains can be guaranteed due to the presence of organic materials. The crystallization process can be carried out by any method of hydrothermal synthesis, dry-gel synthesis or microwave synthesis.

The Third Process: Post-Treatment

After the crystallization process, zeolite can be obtained by a filter method or a centrifuging method, and then subjected to calcinations or a chemical reaction such as hydrogenation, Hoffmann elimination or hydrolysis to remove only the organic materials in totally or in partly. In the zeolite thus obtained, micropores have originated from domains that micro-SDAs occupied and mesopores has originated from domains that meso-SDAs occupied.

The present invention provides a structurally distinct family of zeolite and related zeolite-like molecular sieves that possess secondary mesopores in addition to the intrinsic micropores. This result has been achieved by the addition of organic-functionalized silica precursors into the synthesis composition of molecular sieves. The resultant molecular sieve materials are composed of nanometer-sized microporous frameworks that are assembled into mesoporous architectures or morphologies. The materials exhibit characteristic XRD and electron diffraction patterns corresponding to the frameworks with specific crystalline microporous structures. The presence of the secondary mesopores entitles these molecular sieves a new class of 'microporous-mesoporous' materials, which are especially desirable as cracking or hydrocracking catalysts for the refining of heavy oils containing very high molecular weight fractions.

Despite the more liberal use of the term in some recent publications, as used herein, the term 'zeolite' refers to a crystalline microporous material comprising coordination polyhedra formed only of silicon, aluminum and oxygen. Non-aluminosilicate analogs of microporous crystals such as pure silicates, titanosilicates, silicoaluminophosphates and borosilicates, that exhibit the characteristic molecular-sieving properties similarly to zeolites, are referred to as 'zeolite-like' materials. Both zeolites and zeolite-like materials are encompassed by the term 'molecular sieves'. A publication entitled "Atlas of Zeolite Structure Types", 5th Revised Edition (2001) by authors W. M. Meier, D. H. Olson and Ch. Baerlocher, is a good source of the known zeolites and zeolite-like materials (as of publication date). The synthesis procedures for new zeolites and zeolite-like materials can be found in the publication entitled "Verified Syntheses of Zeolitic Materials", 2nd Revised Edition (2001) by authors H. Robson and K. P. Lillerud. The present inventive method for the preparation of molecular sieve materials possessing secondary mesopores may be practiced with any zeolites and zeolite-like materials mentioned in these references.

The present inventors have found that, if a silica source containing selected organic moieties is added into synthesis gel composition and aged under an alkaline or acidic condition for crystallization, it is possible to obtain microporous molecular sieves possessing secondary mesopores. FIG. 1 schematically describes a synthetic procedure. In this scheme, organic-functionalized silica source is co-polymerized with other gel precursors such as silica and alumina. Due to the non-covalent interactions between organic moieties, including van der Walls force, dipole-dipole or ionic interaction and hydrogen bonding, the organic moieties form a self-assembled hydrophobic domain alternating to inorganic gel domain. Depending on structure and total content of the organic moiety, individual inorganic domains are arranged to have complete, partial or local periodicity on the nanometer scale. The nanometer-sized inorganic gel domain, as stabilized by the organic domain, is converted to a small crystalline microporous domain during hydrothermal crystallization process, wherein excessive growth of the molecular sieve domain is inhibited due to the Si-organic covalent bonding. The organic moieties, which are located at the external surface of the nanometer-sized molecular sieve domains, can easily be removed by calcination or other suitable chemical treatments. Mesopores are generated in the place occupied by the organic moiety.

In the present invention, the key factor for the mesopore generation is selection of organic functional groups that can self-assemble for the formation of the alternating organic-inorganic gel phase. So far, several inventions utilizing organic-functionalized silica source have also been disclosed for the synthesis of molecular sieves. However, the previous inventions related to synthesis methods for molecular sieves containing only micropores, and moreover, the resultant molecular sieves were claimed to have organic functional groups as located inside micropores. For example, Calabro et al. described a synthesis method of molecular sieves using organosilane as a microporedirecting agent (U.S. Pat. No.

5,194,410). Tsuji et al. also described a technology to synthesize molecular sieves incorporating diverse organic functional groups inside micropores (U.S. Pat. No. 6,331,500 B1). In none of these cases, the inventors used organic moieties as a mesopore-directing agent. In contrast, the present invention relates to use of organic functional groups as a mesopore generator, and the resultant molecular sieves are claimed to have the organic functional groups as located on the external surface of molecular sieves (i.e., outside micropores).

Zeolite synthesized according to the present invention has been confirmed that: first, it has a crystal structure of micopores since it exhibits characteristic XRD and electron diffraction patterns corresponding to the conventional molecular sieve structures; second, it has a mesoporosity since its $N_2$ adsorption isotherm shows that the materials possess high volume of mesopores in addition to the intrinsic micropores; and second, it is consisted of crystalline zeolite since its scanning electron microscopy (SEM) reveals that no separated amorphous phase exists. Therefore, Zeolite synthesized according to the present invention is confirmed to be "microporous crystalline zeolite having microporous frameworks or skeletons".

Meanwhile, the "zeolite having mesoporous frameworks" prepared in the present invention also show $^{27}Al$ MAS NMR peaks with the chemical shift in the range of 50-60 ppm, which are characteristic of NMR signals for the microporous zeolite structures, and no $^{27}Al$ MAS NMR peaks with the chemical shift in the range of 0-10 ppm, which indicates the absence of an extra-framework Al (octahedral coordination). Such results of the XRD and NMR data indicate that the microporous molecular sieves having mesoporous skeleton according to the present invention possess a good crystalline structure having atomically ordered and uniform chemical environment around Al sites.

According to one variation of the present invention, zeolite or molecular sieve having mesoporous skeleton synthesized as above may be activated or modified by a post-treatment such as alkaline solution treatment, ion exchange, dealumination, metal incorporation, organic functionalization or the like.

Zeolite or molecular sieve having mesoporous skeleton synthesized by the present invention has advantageous, as compared with conventional zeolite, that additional mesopores linked with micropores greatly improves or modifies the molecule diffusion ability, the catalytic activity and the ion exchange ability, and thereby to facilitate the diffusion and adsorption of organic macromolecules. Therefore, it is expected that zeolite or molecular sieve of the present invention is expected to exhibit superior utilities in separation and catalytic reaction of macromolecules as well as the catalytic reforming process of petroleum including heavy oil.

For example, Zeolite or molecular sieve having mesoporous skeleton synthesized by the present invention can be used to carry out a catalytic process of reforming or modifying hydrocarbon or its substitution states consisting of gaseous phase, liquid phase, solid phase or their mixed phases.

MODE FOR THE INVENTION

In below, the present invention is further described in detail by the working Examples, to which the present invention is not limited. Some abbreviations used in
Examples are described as follows:
TEOS: Tetraethylorthosilicate:
TPABr: Tetrapropylammonium bromide
TPAOH: Tetrapropylammonium hydroxide
TPA$_2$O: Tetrapropylammonium oxide
TEAOH: Tetraethylammonium hydroxide
TEA$_2$O: Tetraethylammonium oxide
TPOAC: [3-(Trimethoxysilyl)propyl]octadecyldimethylammoniumchloride
AEPS: 3-[2-(2-Aminoethylamino)ethylamino]propyl-trimethoxysilane
TSPA: N-[3-(Trimethoxysilyl)propyl]aniline
CTABr: Cetyltrimethylammonium bromide
CPTMS: (3-Chloropropyl)trimethoxysilane
HDPA: (α-Hydroxydodecyl)phosphonic acid

EXAMPLE 1

Synthesis of Mesoporous MFI-Type Aluminosilicate Using Various Organosilanes

TPOAC, TPABr, Ludox AS-40 (40 wt % $SiO_2$), sodium hydroxide, sodium aluminate (53 wt % $Al_2O_3$, 43 wt % $Na_2O$), sulfuric acid and distilled water were mixed to form a gel mixture with the following molar composition:

1Al$_2$O$_3$:2TPA$_2$O:10Na$_2$O:40 SiO$_2$:1800H$_2$O:8H$_2$SO$_4$: 1.6TPOAC.

After aged for 3 h at room temperature, the resultant composition was introduced into a stainless steel autoclave and heated to 170° C. for 2 d. After autoclave was cooled to room temperature, the product was suspended in water, filtered by suction, resuspended in water and filtered again. Then, the product was dried at 110° C. for 10 h. Organic moieties was removed by calcination at 550° C. for 4 h.

Figure 2:
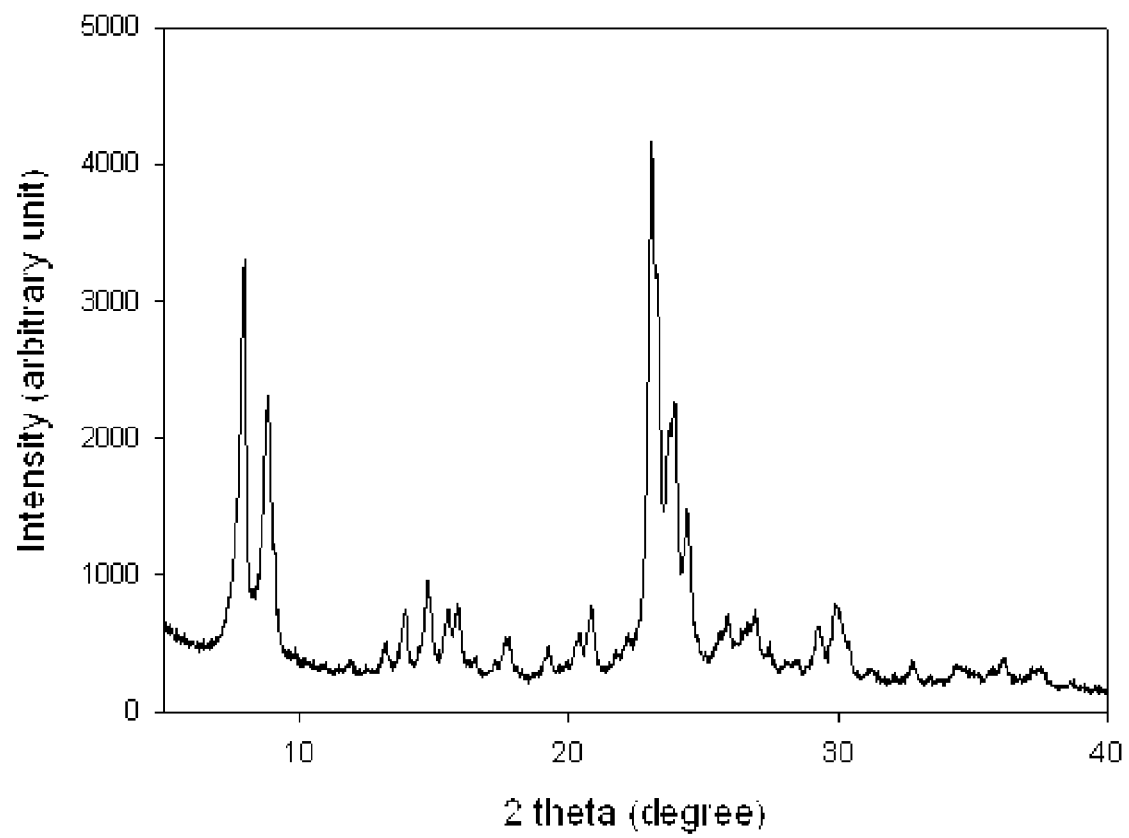
FIG. 2 is an XRD pattern of calcined mesoporous MFI-type aluminosilicate made in accordance with Example 1 of the present invention.
Figure 3:
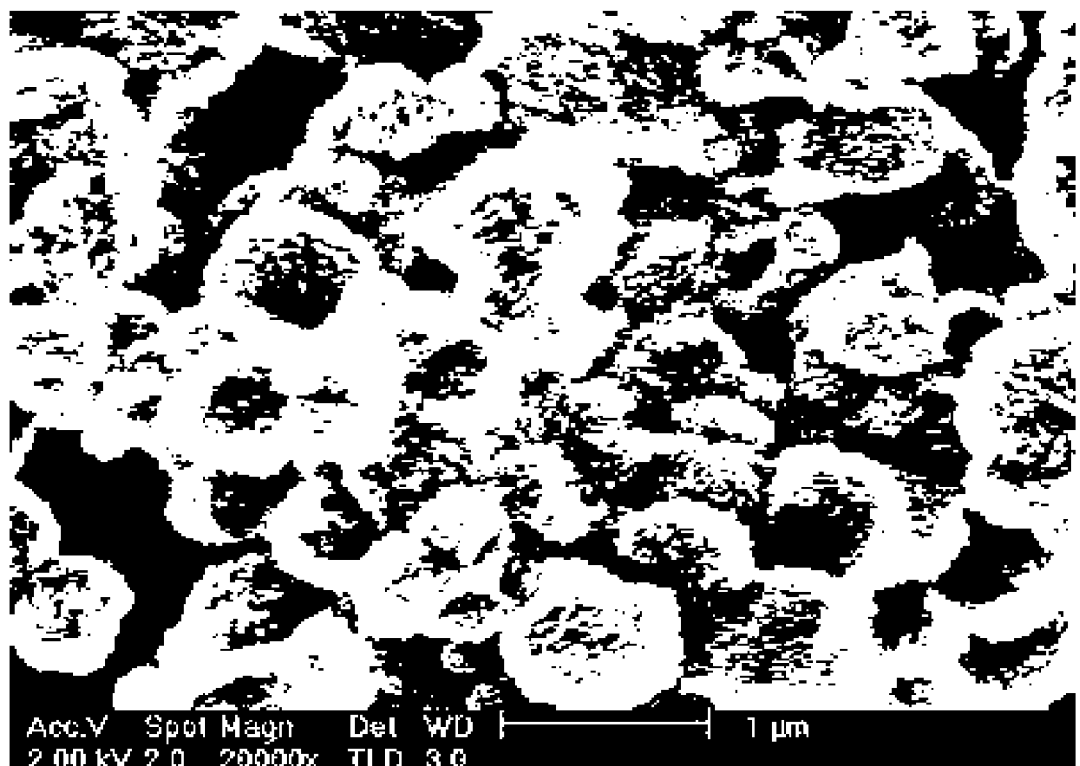
FIG. 3 is SEM images of calcined mesoporous MFI-type aluminosilicate made in accordance with Example 1 of the present invention.
Figure 3:
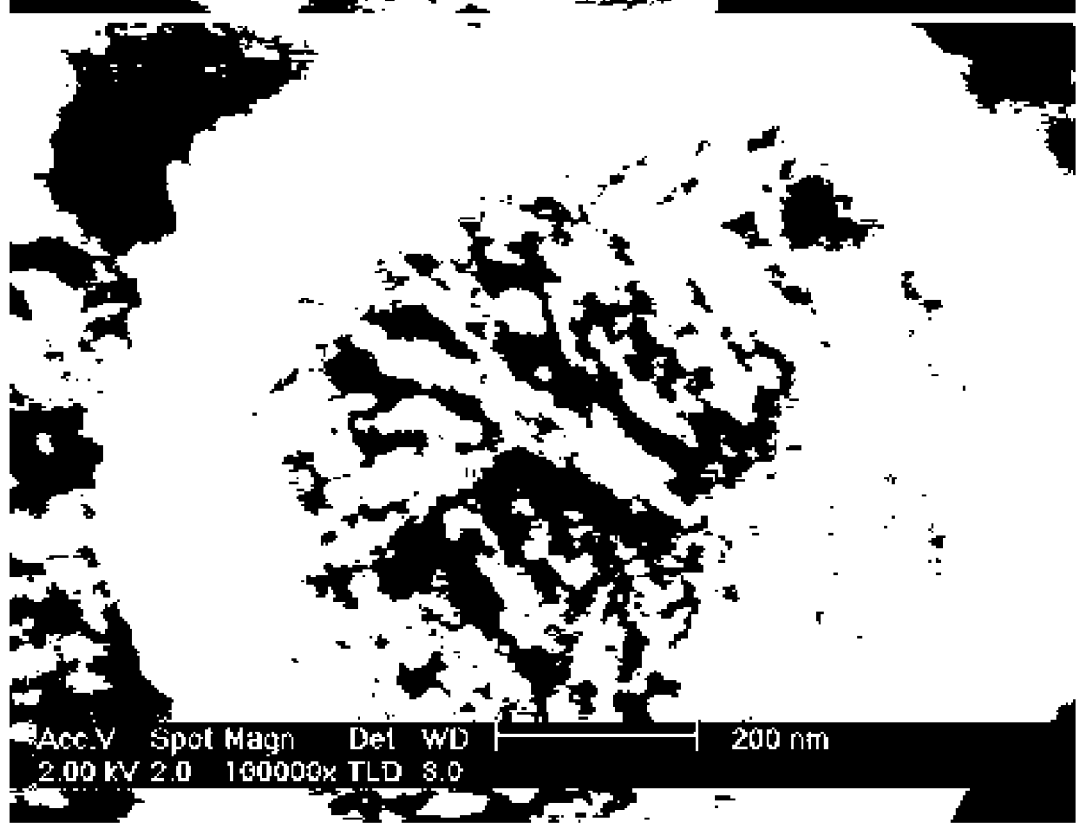
Figure 4:
FIG. 4 is TEM images of calcined mesoporous MFI-type aluminosilicate made in accordance with Example 1 of the present invention.
Figure 4:
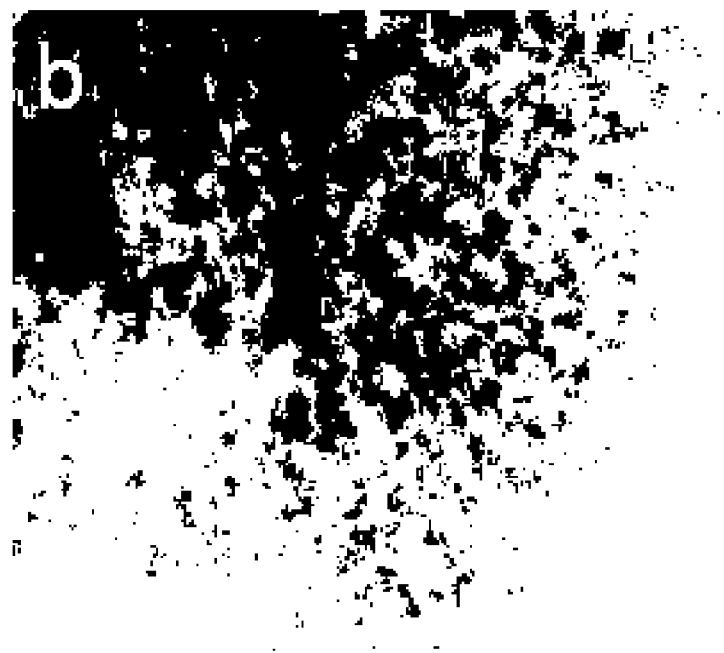
Figure 5:
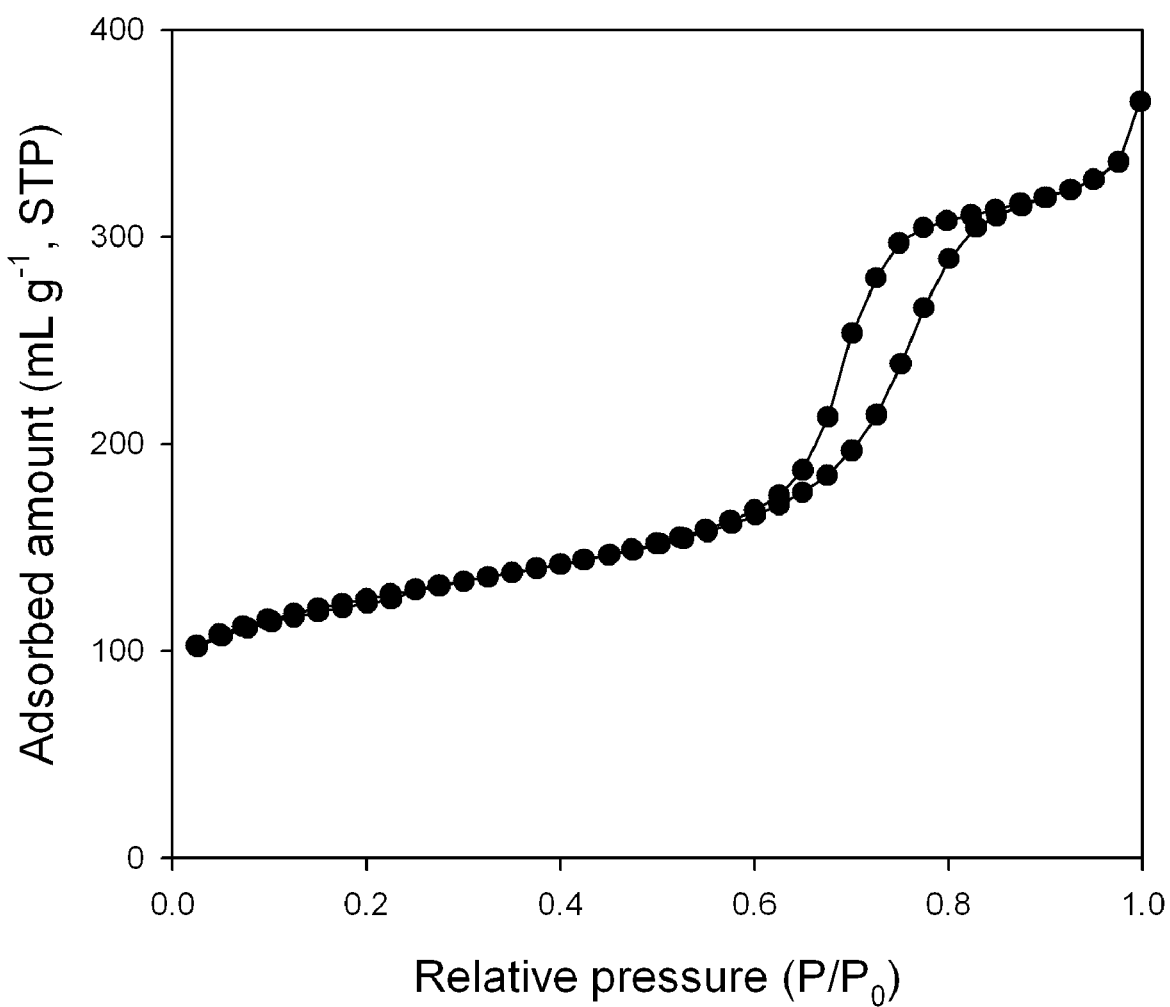
FIG. 5 is a $N_2$ adsorption isotherm of calcined mesoporous MFI-type aluminosilicate made in accordance with Example 1 of the present invention.

XRD pattern of resultant product (FIG. 2) corresponded to the highly crystalline MFI structure. SEM images were obtained without gold plating under low acceleration (1-5 kV) voltage, which provided accurate surface images of the resultant zeolite material (FIG. 3). The images showed alternating arrangement of nanosized (10-20 nm) frameworks and mesopores. Transmission electron microscopy (TEM) image (FIG. 4) revealed that structure of the entire particle was mesoporous, and that the frameworks were crystalline zeolite. $N_2$ adsorption isotherm (FIG. 5) showed that the calcined product possessed a high volume of mesopores (mesopore diameter=8 nm, mesopore volume=0.35 mL/g). The Si/Al ratio of 19 was determined by ICP (Inductive Coupled Plasma) analysis.

Figure 6:
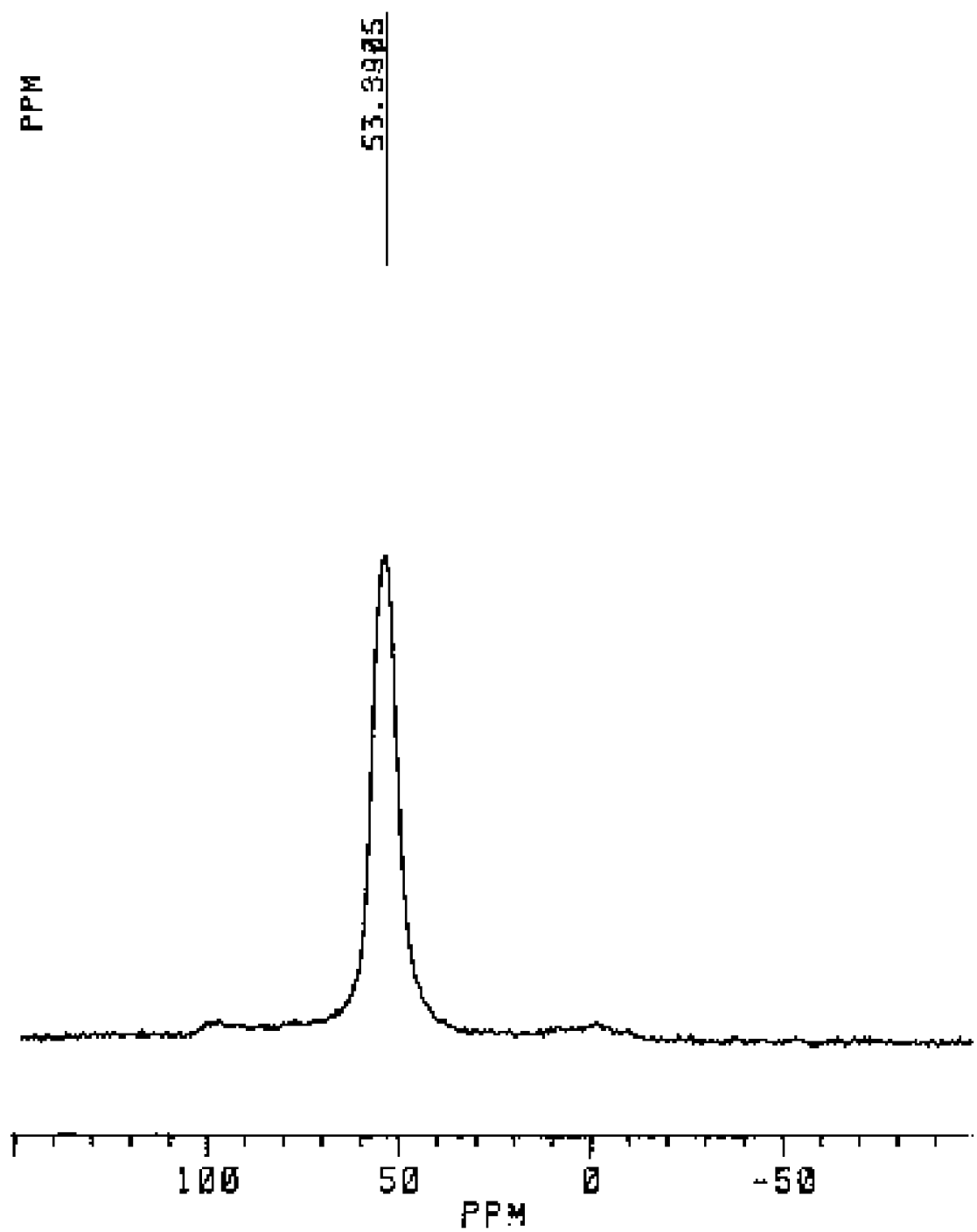
FIG. 6 is a $^{27}Al$ MAS NMR spectrum of calcined mesoporous MFI-type aluminosilicate made in accordance with Example 1 of the present invention.

$^{27}Al$ MAS NMR spectrum of mesoporous MFI zeolite (FIG. 6) showed chemical shift in the range of 57-65 ppm, which is consistent with tetrahedral Al in crystalline zeolite structures. NMR peaks corresponding to the extra-framework Al (octahedral coordination) were not detected in the range of 0-10 ppm.

Synthesis of the mesoporous MFI-type zeolite was also verified with using various types of other organosilanes, mixture of organosilanes, and mixture between organosilanes and organic additives, in addition to the synthesis with TPOAC (see Table 1).

TABLE 1

Zeolite crystallization from a gel composition:
1 Al$_2$O$_3$: 2 TPA$_2$O: 10 Na$_2$O: 40 SiO$_2$: 1800 H$_2$O: 8 H$_2$SO$_4$:
1.6 organosilane: 1.6 additive

| No. | Organosilane | Additive(meso-SDPA) | Mesopore volume of zeolite (mL/g) |
|---|---|---|---|
| 1 | AEPS | — | 0.22 |
| 2 | TSPA | — | 0.16 |
| 3 | CPTMS | CTABr | 0.15 |
| 4 | TPOAC | Isopropanol | 0.42 |

EXAMPLE 2

Synthesis of Mesoporous MFI-Type Aluminosilicate by Using a Mixture of Organosilane and Surfactant CTABr, CPTMS, TPABr, Ludox AS-40 (40 wt % $SiO_2$), sodium hydroxide, sodium aluminate (53 wt % $Al_2O_3$, 43 wt % $Na_2O$), sulfuric acid and distilled water were mixed to form a gel mixture with the molar composition as described in No. 3 of the above Table 1.

Zeolite was crystallized from this gel composition, and the product was collected and calcined as in Example 1.

The calcined product was a highly mesoporous MFI zeolite (mesopore volume=0.15 mL/g). However, when the surfactant was omitted in the gel composition, no significant mesoporosity was detected in the prepared zeolite.

COMPARATIVE EXAMPLE 1

This example was designed to demonstrate that molecular sieves not in accordance with the present invention, i.e., without significant mesoporosity, were obtained if organosilanes were used according to the example sets of previous reports (Example 1 in U.S. Pat. No. 5,194,410 and Example 5 in U.S. Pat. No. 6,331,500 B1), which claimed for the incorporation of organic moieties inside micropores.

Two kinds of organosilanes, [3-(trimethoxysilyl)propyl]trimethylammonium chloride and phenethyltrimethoxysilane, were respectively added into synthesis compositions for the MFI-type aluminosilicate zeolite, as described in these reports. However, the resultant zeolite products exhibited SEM and TEM images that were characteristic of bulk crystals. $N_2$ adsorption isotherm measured after calcination also indicated that the resultant materials were just microporous as conventional zeolites.

EXAMPLE 3

Synthesis of Mesoporous MFI-Type Aluminosilicate with Organic-Functionalized Colloidal Silica as Silica Source This example illustrates that a polymeric form of organic-functionalized silica source can also be used as silica source to synthesize molecular sieves with secondary mesopores. Fumed silica was functionalized with TPOAC by refluxing in toluene solution. The functionalized-silica was mixed with TPABr, sodium hydroxide, sodium aluminate (53 wt % $Al_2O_3$, 43 wt % $Na_2O$) and distilled water. The molar composition of the resultant gel was:

$1Al_2O_3$:2TPA$_2$O:10Na$_2$O:40 SiO$_2$:1800H$_2$O:8H$_2$SO$_4$:
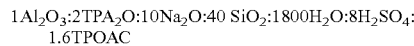1.6TPOAC MFI-type zeolite was crystallized from this gel composition, and the product was collected and calcined as in Example 1. The product possessed mesopores with diameters in the range of 6-8 nm, and the mesopore volume was 0.34 mL/g.

EXAMPLE 4

The purpose of this example is to show that the present invention is not limited to the MFI-type zeolites but also generally applicable for various-types of other zeolites.

A. Synthesis of Mesoporous LTA-Type Aluminosilicate

The following gel composition for LTA zeolite synthesis was prepared with TPOAC, sodium metasilicate (Na/Si=2), sodium hydroxide and sodium aluminate (53 wt % $Al_2O_3$, 43 wt % $Na_2O$) and distilled water:

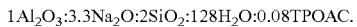1Al$_2$O$_3$:3.3Na$_2$O:2SiO$_2$:128H$_2$O:0.08TPOAC.

Figure 7:
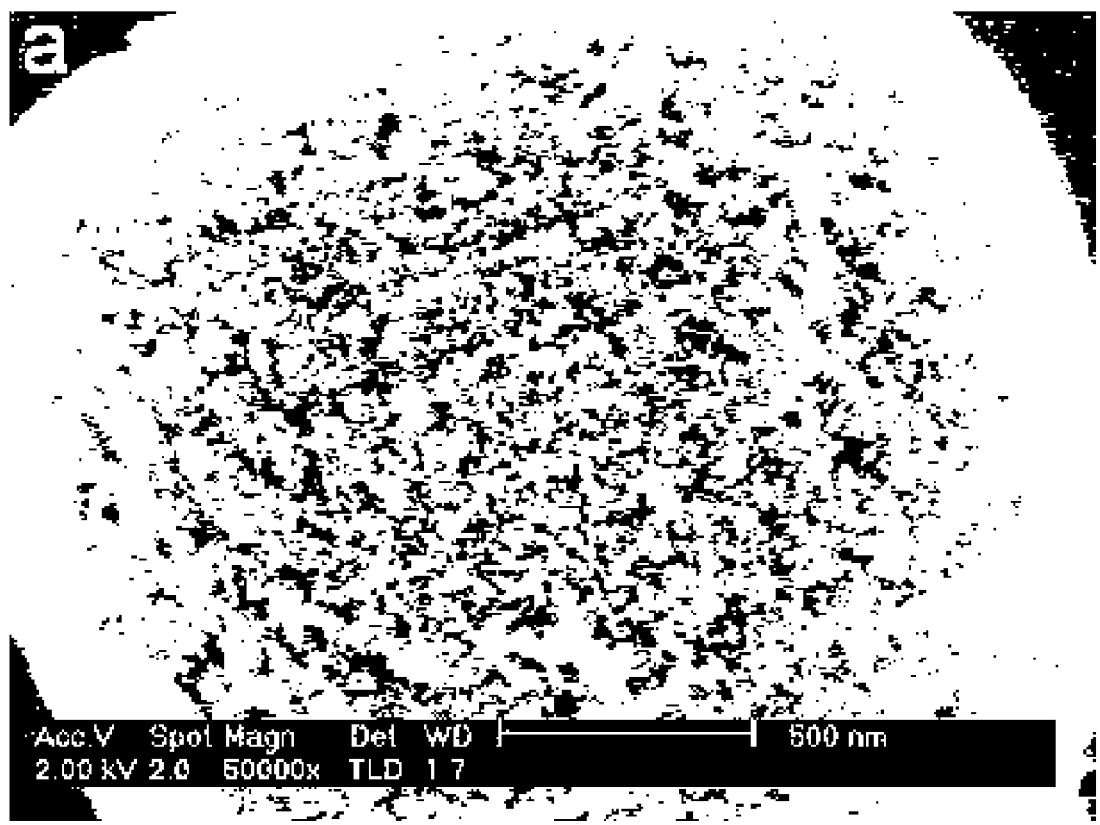
FIG. 7 is SEM images of calcined mesoporous LTA-type aluminosilicate made in accordance with Example 4A of the present invention.
Figure 7:
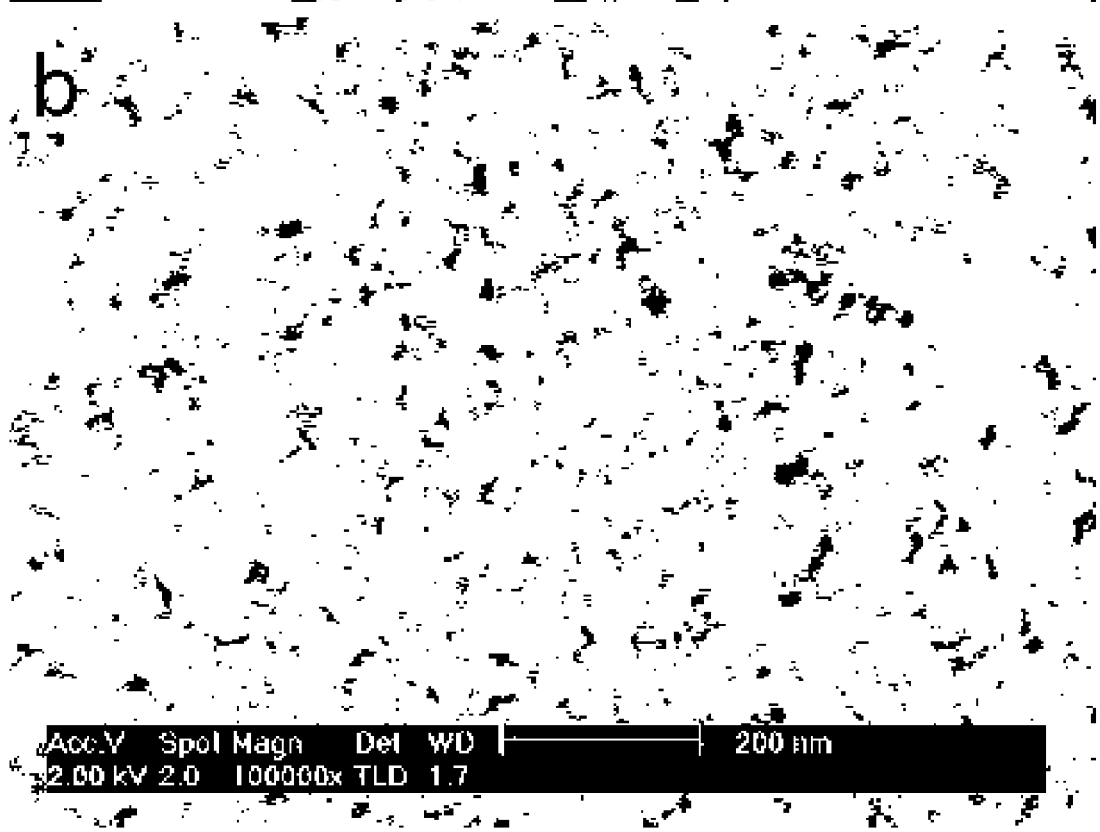

This mixture was heated in a polypropylene flask for 4 h at 95° C. The product was collected and calcined as in Example 1. The product was analyzed with $N_2$ adsorption. The result showed that mesopore diameters were uniform around 14 nm. The mesopore volume was 0.21 mL/g SEM image of the product is shown in FIG. 7.

B. Synthesis of Mesoporous MOR-Type Aluminosilicate

The following gel composition for MOR zeolite was prepared with TPOAC, Ludox AS-40 (40 wt % $SiO_2$), sodium hydroxide, sodium aluminate (53 wt % $Al_2O_3$, 43 wt % $Na_2O$) and distilled water:

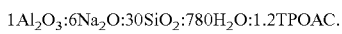1Al$_2$O$_3$:6Na$_2$O:30SiO$_2$:780H$_2$O:1.2TPOAC.

The resultant composition was introduced into a stainless steel autoclave and heated to 150° C. for 7 d. The product was collected and calcined as in Example 1. The product possessed mesopores with diameters in the range of 6-8 nm, and the mesopore volume was 0.17 mL/g.

C. Synthesis of Mesoporous BEA-Type Aluminosilicate

The following gel composition for BEA zeolite was prepared with TPOAC, Ludox AS-40 (40 wt % $SiO_2$), TEAOH, sodium hydroxide, sodium aluminate (53 wt % $Al_2O_3$, 43 wt % $Na_2O$) and distilled water:

1Al$_2$O$_3$:9TEA$_2$O:1.3Na$_2$O:50SiO$_2$:750H$_2$O:
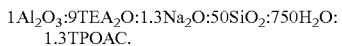1.3TPOAC.

The resultant composition was introduced into a stainless steel autoclave and heated to 150° C. for 5 d. The product was collected and calcined as in Example 1. The product possessed mesopores with diameters in the range of 5-7 nm, and the mesopore volume was 0.19 mL/g.

A BEA zeolite with similar mesoporosity was also crystallized via dry-gel method [See, Matsukata, M. et al., *Microporous and Mesoporous Mater.*, 2002, 56, 1], starting with the same synthesis composition. After aged for 3 h at room temperature, the resultant gel was dried at 80° C. to remove the water. The dried gel was then placed in a Teflon cup, which was placed inside a Teflon lined autoclave. The bottom of the autoclave was filled with sufficient water to saturate water vapor during crystallization. After 2 d at 170° C., the crystallized BEA zeolite was collected, calcined, and characterized as in Example 1.

EXAMPLE 5

The purpose of this example is to demonstrate that the present invention is applicable for the synthesis of various zeolite-like molecular sieves having non-aluminosilicate framework.

A. Synthesis of Mesoporous MFI-Type Pure Silicate

TPOAC, TPAOH, fumed silica and distilled water were mixed in the following molar ratios:

1SiO:0.17TPA$_2$O:20H$_2$O:0.04TPOAC.

Figure 8:
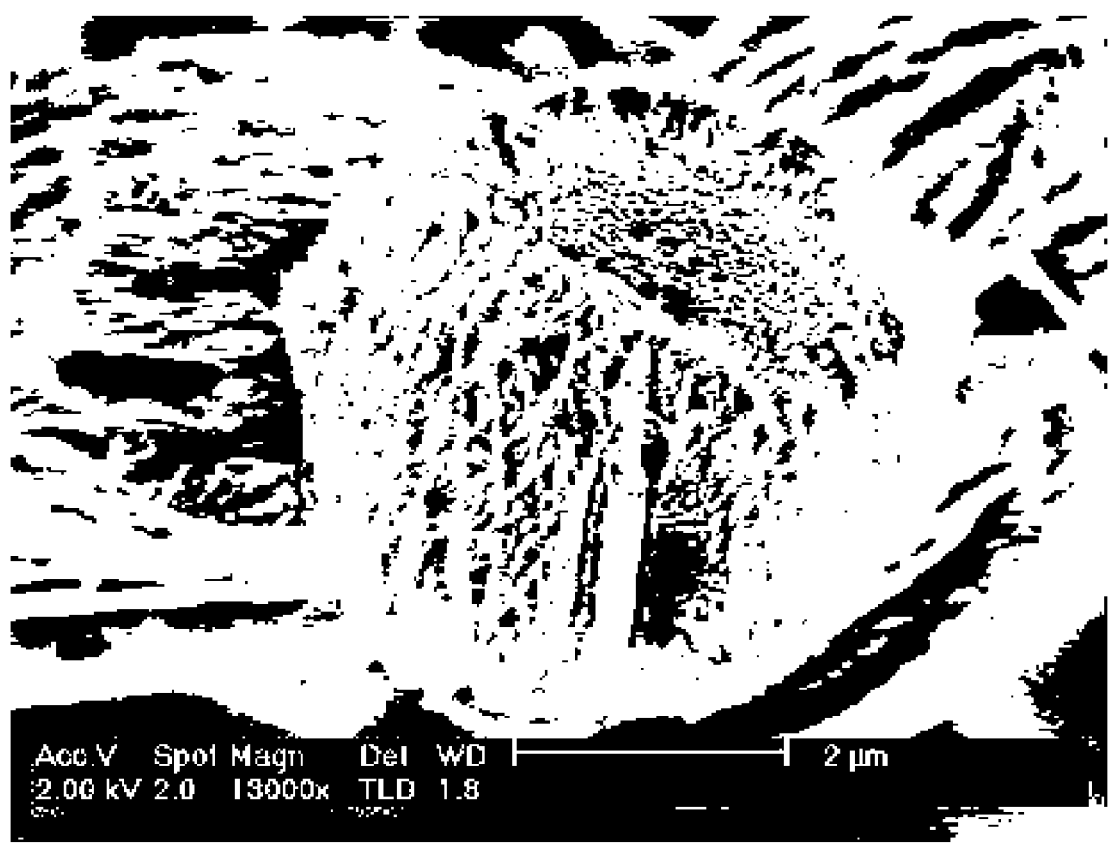
FIG. 8 is SEM images of calcined mesoporous MFI-type pure silicate made in accordance with Example 5A of the present invention.
Figure 8:
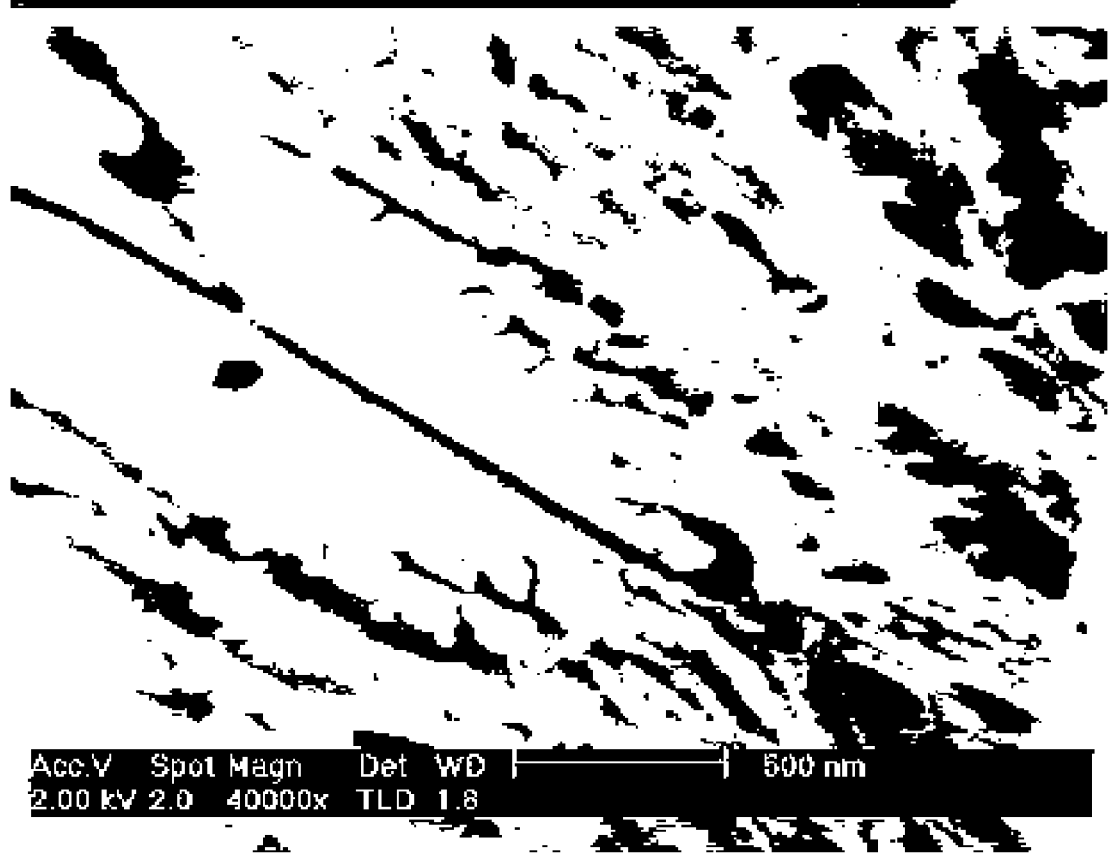

The resultant gel mixture was introduced into a stainless steel autoclave and heated to 170° C. for 12 h. The product was collected and calcined as in Example 1. The product possessed mesopores with diameters in the range of 20-50 nm, and the mesopore volume was 0.22 μL/g The SEM image of the resultant material is shown in FIG. 8.

B. Synthesis of Mesoporous MFI-Type Titanosilicate

TSPA, TPAOH, TEOS, titanium (IV) butoxide and distilled water were mixed in the following molar ratios:

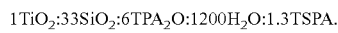

1TiO$_2$:33SiO$_2$:6TPA$_2$O:1200H$_2$O:1.3TSPA.

The resulting clear sol was placed in a stainless steel autoclave, and the autoclave was heated to 170° C. for 2 d. The crystallized titanosilicate molecular sieve was collected and calcined as in Example 1. The product possessed mesopores with diameters in the range of 4-6 nm, and the mesopore volume was 0.14 mL/g C. Synthesis of Mesoporous AFI-Type Aluminophosphate The following gel composition was prepared by mixing HDPA, Catapal B (Pseudo boehmite), H$_3$PO$_4$ (85%), triethylamine and distilled water.

1Al$_2$O$_3$:1.04P$_2$O$_5$:1.5 triethylamine:50H$_2$O:0.055 HDPA.

After aged for 2 h at room temperature, the mixture was introduced into a Teflon lined stainless steel autoclave and heated to 170° C. for 1d. The product was collected and calcined as in Example 1. The mesopore volume was 0.14 mL/g

EXAMPLE 6

The purpose of this example is to demonstrate that molecular sieves corresponding to the present invention can be activated or functionalized for the preparation of catalytic materials, via the post-synthetic modification process.

A. Dealumination of Mesoporous MFI-Type Aluminosilicate

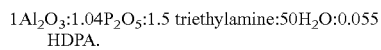

1 g of the mesoporous MFI zeolite prepared in Example 1 was suspended in 40 mL of 2 M oxalic acid solution. After agitation under reflux condition for 1 h at 65° C., zeolite was collected by filtration, washed with distilled water, dried at 120° C., and calcined at 600° C. in air. The Si/Al ratio of the zeolite changed from 19 to 28, due to this dealumination treatment. However, the XRD pattern characteristic of MFI structure was retained.

B. Dissolution of Mesoporous MFI-Type Aluminosilicate by Alkaline Solution 1 g of the mesoporous MFI zeolite prepared in Example 1 was suspended in 100 mL of 0.1 M NaOH solution. After the suspension was stirred for 6 h, zeolite was filtered, washed with distilled water, and dried at 120° C. The mesopore diameters of the zeolite increased from 8 to 10 nm, due to the alkali treatment.

C. Proton Exchange of Mesoporous MFI-Type Aluminosilicate with Ammonium Nitrate Solution 1 g of the mesoporous MFI zeolite prepared in Example 1 was suspended in the 40 mL of 1 M ammonium nitrate solution. After agitation under reflux condition for 5 h at 50° C., zeolite was collected by filtration, washed with distilled water, dried at 120° C., and calcined at 600° C. in air. Practically all Na$^+$ ions in the zeolite were replaced by H$^+$ during this treatment.

EXAMPLE 7

Five catalytic reactions are designed in this example to illustrate that the present invention is not limited to the mesoporous-microporous molecular sieve materials and their preparation methods, but that the materials according to the present invention can be applied to various catalytic processes.

A. Application of Mesoporous MFI Zeolite as a Catalyst for Vapor Phase Methanol Transformation to Olefins and Gasoline The mesoporous H$^+$-exchanged MFI zeolite prepared in Example 6C was powdered, pressed without binder, and crushed and sieved to get particles of 14-20 mesh size. For comparison, a conventional MFI-type zeolite referred to as ZSM-5 (Si/Al=19) was synthesized without the addition of organic-functionalized silica source. The catalytic activity in the conversion of methanol was measured using custombuilt continuous up-flow stainless steel reactor (inside diameter=10 mm; ouside diameter=11 mm; and length=45 cm) combined with the online gas chromatograph. In a typical experiment, 100 mg of catalyst was diluted with 5 parts of 20 mesh sea sand (washed) to dissipate the heat of reaction and packed over catalyst bed (½ filter GSKT-5u) in a stainless-steel reactor and heated to 550° C. in flow of nitrogen for a total period of 8 h. After the reactor was cooled to reaction temperature of 325° C., methanol was injected at a flow rate of 0.02 mL/min using a syringe pump. Nitrogen flow was maintained as 20 mL/min. Samples were periodically analyzed by gas chromatography (GC). The product distribution is shown in Table 2. The result indicates that mesoporous catalysts of the present invention exhibit significantly different product distribution compared with conventional catalysts.

TABLE 2

| Product distribution | Mesoporous MFI-type zeolite (%) | Conventional MFI-type zeolite (%) |
|---|---|---|
| C$_2$H$_4$ | 11.4 | 42.5 |
| C$_3$H$_6$ | 51.2 | 0 |
| C$_4$H$_8$ | 8.6 | 12.6 |
| Other aliphatics | 3.3 | 13.1 |
| Benzene | 1.3 | 2.6 |
| Tolune | 1.0 | 1.4 |
| Xylene | 2.9 | 8.9 |
| Trimethylbenzene | 5.2 | 9.2 |
| C$_{10+}$ | 14.6 | 9 |
| Others | 0.5 | 0.7 |
| Total | 100 | 100 |
| Selectivity to olefins (%) | 71.2 | 55.1 |
| Selectivity to gasoline (%) | 25 | 31.1 |

B. Isopropylation of Benzene

Two MFI samples were prepared, packed in a flow reactor and activated at 550° C. as described in Example 7A. After reactor was cooled to the reaction temperature, 210° C., a mixture of benzene and 2-propanol (6.5:1 molar ratio) was injected at a flow rate of 0.005 μL/min using a syringe pump. Nitrogen flow was maintained at 20 mL/min. Products were periodically analyzed by GC. The product distribution was shown in Table 3.

TABLE 3

| Product distribution | Mesoporous MFI-type zeolite (%) | Conventional MFI-type zeolite (%) |
|---|---|---|
| C$_2$H$_4$ | 1.06 | 1.94 |
| C$_3$H$_6$ | 1.63 | 1.66 |
| C$_4$H$_8$ | 1.57 | 1.28 |
| Benzene | 86.53 | 85.6 |
| Tolune | 0 | 0 |
| Ethylbenzene | 0 | 0 |
| Cumene | 5.61 | 7.15 |

TABLE 3-continued

| Product distribution | Mesoporous MFI-type zeolite (%) | Conventional MFI-type zeolite (%) |
|---|---|---|
| Isobutylbenzene | 1.57 | 1.25 |
| Diisopropylbenzene | 0.86 | 0.37 |
| Others | 1.17 | 0.75 |
| Total | 100 | 100 |
| Selectivity to cumene | 69.78 | 81.53 |
| Selectivity to diiso-proylbenzene | 10.70 | 4.22 |
| Selectivity to Aromatics | 8.04 | 8.77 |
| Conversion of Benzene | 8.50 | 9.29 |

C. Liquid Phase Condensation of 2-Hydroxyacetophenone with Benzaldehyde

Two MFI samples were prepared and ion-exchanged with H+ as described in Example 7A. Reactions were carried out in a batch Pyrex reactor equipped with reflux condenser. 0.1 g of catalyst powder was activated by heating for 2 h at 180° C., and subsequently, added into the reactor containing 20 mmol of water-free 2-hydroxyacetophenone (Aldrich) and 20 mmol of benzaldehyde (Aldrich). Reaction was carried out at 140° C. under helium atmosphere with magnetic stirring. Products were periodically analyzed by GC. As the product distribution shows in Table 4, the mesoporous catalyst exhibited a superior activity to the conventional zeolite.

C. Liquid Phase Condensation of 2-Hydroxyacetophenone with Benzaldehyde

Two MFI samples were prepared and ion-exchanged with H+ as described in Example 7A. Reactions were carried out in a batch Pyrex reactor equipped with reflux condenser. 0.1 g of catalyst powder was activated by heating for 2 h at 180° C., and subsequently, added into the reactor containing 20 mmol of water-free 2-hydroxyacetophenone (Aldrich) and 20 mmol of benzaldehyde (Aldrich). Reaction was carried out at 140° C. under helium atmosphere with magnetic stirring. Products were periodically analyzed by GC. As the product distribution shows in Table 4, the mesoporous catalyst exhibited a superior activity to the conventional zeolite.

TABLE 4

| Catalyst | Reaction time (h) | Conversion of 2-hydroxy-acetophenone (%) | Product distribution (%) | |
|---|---|---|---|---|
| | | | 2-hydroxy-chalcone | Flavanone |
| Mesoporous MFI-type zeolite | 5 | 18.7 | 19.6 | 80.4 |
| | 24 | 50.2 | 15.9 | 84.1 |
| Conventional MFI-type zeolite | 5 | 4.5 | 6.7 | 93.3 |
| | 24 | 35.6 | 14.6 | 85.4 |

D. Acetylation of Anisole with Acetic Anhydride

Two MFI samples were prepared, ion-exchanged with H+ and activated at 180° C. as described in Example 7C.

Figure 9:
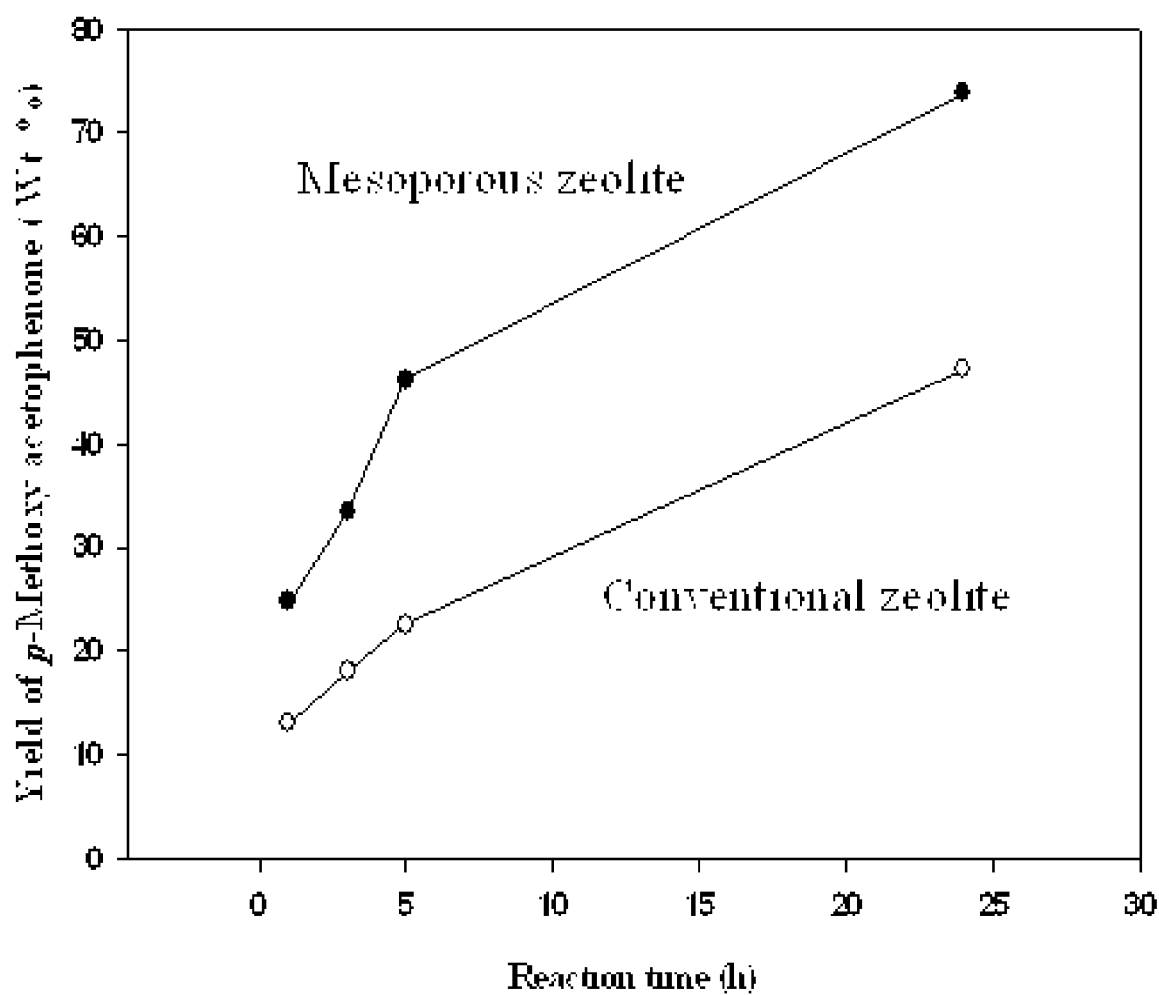
FIG. 9 is a conversions-vs.-time curve for the acetylation reaction of anisole with acetic anhydride, which was performed in accordance with Example 7D of the present invention.

The reaction was also carried out in the same way described in Example 7C, except that 0.17 g catalyst was used for the reaction of 10 mmol of water-free anisole (Aldrich) and 10 mmol of acetic anhydride at 100° C. As the conversion (%) vs time(t) curves in FIG. 9 show, the mesoporous zeolite exhibited a superior catalytic activity to the conventional catalyst.

E. Catalytic Degradation of Plastic Waste to Hydrocarbon Fuel

Two MFI samples were prepared, ion-exchanged with H+ and activated as described in Example 7C.

Unstabilized linear low-density polyethylene in a powder form (0.928 g/cm$^3$ and an average molar mass of 117 kg/mol) was used as a model plastic feed. A mixture of 10 g of plastic and 0.1 g of catalyst was loaded into the semi-batch Pyrex reactor equipped with mechanical stirrer. Subsequently, the reactor was heated with a rate of 6° C./min up to 340° C., which was maintained for 2 h. The volatile products were swept from the reactor by a continuous nitrogen flow (35 ml/min). Subsequently, the liquid fraction was condensed in an ice trap and the gaseous fraction was collected in a gas-bag. After the reaction, both liquid and gaseous fractions were analyzed by GC.

The product distribution is shown in Table 5. The result indicates that mesoporous zeolite of the present invention exhibit superior catalytic activity to the conventional zeolite.

TABLE 5

| Catalyst | Converison (%) | Selectivity by groups (wt %) | | |
|---|---|---|---|---|
| | | $C_1$-$C_5$ | $C_6$-$C_{12}$ | >$C_{13}$ |
| Mesoporous MFI-type zeolite | 81.2 | 89 | 11 | 0 |
| Conventional MFI-type zeolite | 52.1 | 95 | 5 | 0 |

Although the present invention has been described in relation to particular embodiments thereof, many other variations and modifications and other use will become apparent to those skilled in the art. It is preferred, therefore, that the present invention must be limited by the specific disclosure herein, but only by the appended claims.

INDUSTRIAL APPLICABILITY

Zeolite or molecular sieve having mesoporous skeleton synthesized by the present invention has advantageous, as compared with conventional zeolite, that additional mesopores linked with micropores greatly improves or modifies the molecule diffusion ability, the catalytic activity and the ion exchange ability, and thereby to facilitate the diffusion and adsorption of organic macromolecules. Therefore, it is expected that zeolite or molecular sieve of the present invention is expected to exhibit superior utilities in separation and catalytic reaction of macromolecules as well as the catalytic reforming process of petroleum including heavy oil.

The invention claimed is:

1. A method of preparing a microporous crystalline molecular sieve materials having mesoporous skeleton, characterized in that a meso-SDA (structural-directing agent) is added into a gel composition for the synthesis of a molecular sieve containing a micro-SDA to form an organic-inorganic composite gel structure, wherein said meso-SDA is selected from the group consisting of an organosilane having the following formula (1), an organophosphonic acid having the following formula (2), and a silica precursor organo-functionalized with said organosilane or organophosphonic acid:

$$RSiX_3 \text{ or } R_2SiX_2 \text{ or } R_3SiX \tag{1}$$

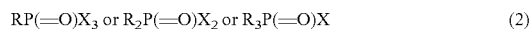
$$RP(=O)X_3 \text{ or } R_2P(=O)X_2 \text{ or } R_3P(=O)X \tag{2}$$

wherein X represents a hydrolysable group selected from the group consisting of hydroxyl, halide and alkoxy, and wherein R represents a $C_{2-30}$ alkyl or alkenyl group, wherein the alkyl group may have a substituent selected from the group consisting of hydroxyl, halide, thiol, amino, cyano, nitro, amide, carboxylic acid, sulphonic acid, glycidyl, aryl and heteroaryl and may have 1 to 3 heteroatoms selected from the group consisting of N, O, S and Si in alkyl chain.

2. The method according to claim 1, wherein the method comprises the following steps:(a) adding said meso-SDA into a gel composition of synthesizing a molecular sieve containing a micro-SDA, a silicon source and an aluminum source; (b) subjecting the resulted material obtained in the above step (a) to crystallization by a hydrothermal reaction, a microwave reaction, or a dry-gel synthesis; and (c) removing selectively organic materials from the resulted material obtained in the above step (b) by calcinating or chemical treatment.

3. The method according to claim 1, wherein said silica precursor organo-functionalized with an organosilane or organophosphonic acid is prepared by reacting an organosilane having formula (1) or an organophosphonic acid having formula (2) with a silica precursor selected from the group consisting of silicate ion, colloidal fumed silica, silica gel and precipitated silica.

4. The method according to claim 1, wherein said gel composition for the synthesis of a molecular sieve further contains a meso-SDSA (meso-Structure Directing Supplement Agent) which is selected from the group consisting of alcohol, surfactants, high molecular-weight materials, biomaterials and inorganic salts.

5. The method according to claim 1, wherein said micro-SDA is selected from the group of consisting of tetramethylammonium, tetraethylammonium and tetrapropylammonium.

6. The method according to claim 1, wherein said meso-SDA is used in an amount of 0.01 about 0.50 mol %, based on the amount of SiO or its precursor.

7. The method according to claim 1, wherein said molecular sieve has the same chemical composition with aluminosilicate, silicate, titanosilicate, aluminophosphate, silicoaluminophosphate or borosilicate.

* * * * *